US012738421B2

(12) United States Patent
Rahimabady et al.

(10) Patent No.: US 12,738,421 B2
(45) Date of Patent: Sep. 15, 2026

(54) DIELECTRIC NANOFLUID FOR A CAPACITOR SYSTEM

(71) Applicant: Eaton Intelligent Power Limited, Dublin (IE)

(72) Inventors: Mojtaba Rahimabady, Shorewood, WI (US); Chao Li, Franksville, WI (US); Eric Ward, Franksville, WI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/879,628

(22) Filed: Aug. 2, 2022

(65) Prior Publication Data

US 2023/0065268 A1 Mar. 2, 2023

Related U.S. Application Data

(60) Provisional application No. 63/236,356, filed on Aug. 24, 2021.

(51) Int. Cl.
*H01G 4/20* (2006.01)
*H01G 4/22* (2006.01)
(Continued)

(52) U.S. Cl.
CPC ............... *H01G 4/20* (2013.01); *H01G 4/206* (2013.01); *H01G 4/221* (2013.01); *H01G 4/385* (2013.01); *H01G 4/224* (2013.01); *H01G 4/32* (2013.01)

(58) Field of Classification Search
CPC .......... H01G 4/32; H01G 4/224; H01G 4/385; H01G 4/206; H01G 4/20; H01G 4/221
See application file for complete search history.

(56) References Cited

U.S. PATENT DOCUMENTS 2,162,475 A * 6/1939 Brooks .................... H01G 4/38 361/329
2,231,701 A * 2/1941 Brooks .................... H01G 4/38 361/275.1
(Continued)

FOREIGN PATENT DOCUMENTS

AU 2013204677 A1 5/2013
CA 2396248 C 8/2012
(Continued)

OTHER PUBLICATIONS

Y. Du et al., "Effect of semiconductive nanoparticles on insulating performances of transformer oil," in IEEE Transactions on Dielectrics and Electrical Insulation, vol. 19, No. 3, pp. 770-776, Jun. 2012, doi: 10.1109/TDEI.2012.6215079 (Year: 2012).*
(Continued)

*Primary Examiner* — David M Sinclair
(74) *Attorney, Agent, or Firm* — DiBerardino McGovern IP Group LLC

(57) ABSTRACT

A power capacitor includes a body that defines an interior space; and at least one capacitive device in the interior space. The capacitive device includes a first electrode; and a second electrode separated from the second electrode. The power capacitor also includes a dielectric nanofluid in the interior space and between the first electrode and the second electrode, the dielectric nanofluid including: a base dielectric fluid; and nanoparticles dispersed in the base dielectric fluid.

23 Claims, 11 Drawing Sheets

(51) Int. Cl.

| | |
|---|---|
| ***H01G 4/32*** | (2006.01) |
| ***H01G 4/38*** | (2006.01) |
| *H01G 4/224* | (2006.01) |

(56) References Cited

U.S. PATENT DOCUMENTS

| | | | | |
|---|---|---|---|---|
| 3,292,061 A | 12/1966 | Eustance | | |
| 3,754,311 A | 8/1973 | Rayburn | | |
| 4,916,285 A * | 4/1990 | Baur | B23K 26/123 219/121.72 | |
| 4,931,843 A * | 6/1990 | Goetz | H01G 4/228 361/323 | |
| 6,177,031 B1 * | 1/2001 | Minnick | H01G 4/04 252/570 | |
| 6,726,857 B2 | 4/2004 | Goedde et al. | | |
| 6,807,046 B2 | 10/2004 | Reiner et al. | | |
| 9,490,067 B2 | 11/2016 | Li et al. | | |
| 11,232,884 B2 | 1/2022 | Lebrun et al. | | |
| 2009/0103239 A1 * | 4/2009 | Fellers | C08K 5/07 524/396 | |
| 2009/0270644 A1 | 10/2009 | Kano et al. | | |
| 2010/0243969 A1 | 9/2010 | Rebouillat et al. | | |
| 2010/0271755 A1 * | 10/2010 | Kaminska | H01G 4/18 29/25.42 | |
| 2010/0279904 A1 | 11/2010 | Deskin et al. | | |
| 2012/0186789 A1 * | 7/2012 | Sedarous | C09K 5/10 977/734 | |
| 2013/0099182 A1 | 4/2013 | Rebouillat et al. | | |
| 2013/0136203 A1 | 5/2013 | Chen et al. | | |
| 2013/0285781 A1 | 10/2013 | Yin | | |
| 2014/0036447 A1 | 2/2014 | Knowlton et al. | | |
| 2014/0347784 A1 * | 11/2014 | Stockman | H01G 4/236 361/329 | |
| 2016/0049219 A1 | 2/2016 | Knowlton et al. | | |
| 2019/0318873 A1 | 10/2019 | Fellers et al. | | |

FOREIGN PATENT DOCUMENTS

| | | | | |
|---|---|---|---|---|
| CN | 102623113 A * | 8/2012 | H01B 3/20 |
| CN | 105869882 A * | 8/2016 | H01G 2/14 |
| CN | 103988266 B | 3/2017 | |
| DE | 102004052836 A1 | 5/2006 | |
| EP | 0180894 A1 * | 5/1986 | |
| EP | 3431530 A1 | 1/2019 | |
| EP | 3576109 A1 | 12/2019 | |
| EP | 3809432 A1 | 4/2021 | |
| ID | 201902439 A | 4/2019 | |
| JP | 2015536548 A | 12/2015 | |
| JP | 2015536549 A | 12/2015 | |
| JP | 6121459 B2 | 4/2017 | |
| KR | 101313969 B1 | 10/2013 | |
| KR | 10908145 B1 | 10/2018 | |
| WO | WO-2008071704 A1 * | 6/2008 | H01B 3/20 |
| WO | 2012001043 A1 | 1/2012 | |
| WO | 2014078156 A1 | 5/2014 | |
| WO | 2014078164 A1 | 5/2014 | |

OTHER PUBLICATIONS

Madavan R. et al, Investigation on effects of different types of nanoparticles on critical parameters of nano-liquid insulation systems, Journal of Molecular Liquids, vol. 230, Mar. 2017, pp. 437-444 (Year: 2017).*

Thirugnanam et al., Performance studies on dielectric and physical properties of eco-friendly based natural ester oils using semi-conductive nanocomposites for power transformer application, IET Science, Measurement & Technology, vol. 12, Iss 3, May 2018, pp. 323-327 (Year: 2018).* https://armorlubricants.com/blog/understanding-dielectric-transformer-oil/ (Year: 2019).*

European International Searching Authority, International Search Report and Written Opinion, counterpart PCT Application No. PCT/EP2022/025380, mailed Jan. 5, 2023, 15 pages total.

Power Capacitors, Cooper Power Series Brochure, Publication No. SA230003EN / GG, Eaton, Jul. 2020, 3 pages.

Cooper McGraw Edison™ EX™-7, Eaton's Cooper Power Systems—Power Capacitors—Capacitor Banks and Switches Brochure, Cooper (Shanghai) Power Capacitor Co., Ltd., date unknown, available at https://www.eaton.com/content/dam/eaton/products/utility-and-grid-solutions/capacitor/ex-7l-ex-7li-capacitor/Eaton-EX-7LEX-7Li-Capacitor-Brochure-EN-US.pdf, last Accessed Aug. 2, 2022, 4 pages.

Power Capacitors: fundamentals of power capacitors, Eaton, available at https://www.eaton.com/us/en-us/products/medium-voltage-power-distribution-control-systems/power-capacitors/fundamentals-of-power-capacitors.html, Accessed Jun. 28, 2021, 14 pages.

Capacitor element technology: Improving system reliability and performance, Cooper Power Series, Publication No. WP230002EN, Eaton, available at www.eaton.com/cooperpowerseries, Apr. 2019, 4 pages.

High Voltage Capacitors, GE, available at https://www.gegridsolutions.com/hvmv_equipment/catalog/high_volt_capacitor.htm, Accessed Jul. 15, 2022, 2 pages.

Keshavamurthy, H.C. et al, "Novel capacitor fluid from vegetable oil," Conference Record of the 1998 IEEE International Symposium on Electrical Insulation (Cat. No. 98CH36239), 1998, pp. 452-455 vol. 2, doi: 10.1109/ELINSL.1998.694831.

GEI-28004C No. 10-C Insulating Oil for Use in Transformers, Regulators and Oil-Immersed Reactors Manual—General Electric, https://ecpsolutions.com/shop/gei-28004c-no-10-c-insulating-oil-for-use-in-transformers-regulators-and-oil-immersed-reactors-manual-general-electric/, 1 page.

Swedish Intellectual Property Office, Office Action and Search Report in counterpart SE Patent Application No. 2450299-9, mailed Sep. 10, 2024, 10 pages total.

Hou, Y. et al., "The investigation of propylene carbonate based nanofluids as an energy storage medium for pulsed power sources", IEEE 21st International Conference on Pulsed Power (PPC), Brighton, UK, Jun. 18-22, 2017, 6 pages total.

Koutras, K. et al., "The Influence of Nanoparticles' Conductivity and Charging on Dielectric Properties of Ester Oil Based Nanofluid", Energies, vol. 13(24), 6540, Dec. 11, 2020, 16 pages total.

Markovic, M. et al., "Transformer Lifetime Management through Solid and Liquid Insulation Assessment", Euro TechCon 2018, Feb. 7, 2019, 26 pages total.

SAS-60E Safety Data Sheet, NCTI, according to Federal Register, vol. 77, No. 58, Mar. 26, 2012, revised Oct. 4, 2021, 7 pages total.

Standard Specification for Mineral Insulating Liquid Used in Electrical Apparatus, ASTM International Designation D3487-24, Jun. 2024, 6 pages total.

Standard Specification for Natural (Vegetable Oil) Ester Fluids Used in Electrical Apparatus, ASTM International Designation D6871-17, Dec. 2017, 4 pages total.

IEEE Guide for Acceptance and Maintenance of Insulating Mineral Oil in Electrical Equipment, IEEE Standards Association, IEEE Std C57.106-2015, Mar. 23, 2016, 38 pages total.

Berger, N., Jarylec Dielectric liquid for capacitors, DIE 4888, Jan. 2001, 12 pages total.

SAS-60E High Performance Capacitor Fluid Technical Document 110113, NCTI, 11 pages total.

Canadian Intellectual Property Office, Office Action, counterpart CA Application No. 3,229,342, mailed Feb. 21, 2025, 4 pages total.

Canadian Intellectual Property Office, Second Office Action, counterpart CA Application No. 3,229,342, mailed Dec. 2, 2025, 4 pages total.

Intellectual Property India, First Examination Report, counterpart IN Application No. 202417012380, mailed Dec. 16, 2025, 9 pages total.

Swedish Intellectual Property Office, Office Action, counterpart SE Patent Application No. 2450299-9, mailed Dec. 29, 2025, 6 pages total.

Wu, S., et al., "Effects of TiO2 nanoparticles and electrodes surface-modified by low-temperature plasma on impulse breakdown voltage

(56) References Cited

OTHER PUBLICATIONS of propylene", IEEE Transactions on Dielectrics and Electrical Insulation, vol. 27, No. 2, April 2020, 8 pages total.

* cited by examiner

DIELECTRIC NANOFLUID FOR A CAPACITOR SYSTEM

CROSS-REFERENCE TO RELATED APPLICATION

This application claims the benefit of U.S. Provisional Application No. 63/236,356, filed on Aug. 24, 2021 and titled DIELECTRIC NANOFLUID FOR A CAPACITOR SYSTEM, which is incorporated herein by reference in its entirety.

TECHNICAL FIELD

This disclosure relates to a dielectric nanofluid for a capacitor system, such as, for example, a power capacitor.

BACKGROUND

A capacitor system may be used to compensate reactive power in an electrical power system and to correct the power factor of the power system.

SUMMARY

In one aspect, a power capacitor includes a body that defines an interior space; and at least one capacitive device in the interior space. The capacitive device includes a first electrode; and a second electrode separated from the second electrode. The power capacitor also includes a dielectric nanofluid in the interior space and between the first electrode and the second electrode, the dielectric nanofluid including: a base dielectric fluid; and nanoparticles dispersed in the base dielectric fluid.

Implementations may include one or more of the following features.

The nanoparticles may include particles of a dielectric material.

The nanoparticles may include particles of a semiconductor material.

The nanoparticles may include particles of a metal oxide. At least some of the nanoparticles may include titanium dioxide ($TiO_2$).

At least some of the nanoparticles may include aluminum oxide ($Al_2O_3$), silicon dioxide ($SiO_2$), silica, ceramic, or iron oxide ($Fe_2O_3$).

The concentration of the nanoparticles in the base dielectric fluid may be less than 0.1% by weight.

The concentration of the nanoparticles in the base dielectric fluid may be less than 0.025% by weight.

The concentration of nanoparticles in the base dielectric fluid may be between 0.01% by weight and 0.025% by weight.

The first electrode and the second electrode may include a mechanically cut metallic material. The mechanically cut metallic material may be a mechanically cut metal foil.

The first electrode and the second electrode may include a laser cut metallic material.

The nanoparticles may have a diameter of less than 30 nanometers (nm).

In some implementations, the power capacitor also includes at least one bushing that extends from an exterior surface of the body, the bushing includes an electrical interface electrically connected to at least one capacitor pack in the interior space, and the electrical interface is configured to electrically connect at least one capacitor pack to an external electrical device.

The power capacitor may be rated for use at voltages of 1000 Volts or greater, a plurality of capacitive devices may be in the interior space, each capacitive device may be a capacitor pack that further comprises a dielectric material, and the dielectric nanofluid may be between the first electrode and the second electrode of each capacitor pack. The dielectric material may be a plurality of dielectric films, with at least one dielectric film being between the first electrode and the second electrode. Each capacitor pack may be a wound capacitor pack.

The base dielectric fluid may include a green dielectric fluid.

The base dielectric fluid may include a seed-based dielectric fluid, a plant-based dielectric fluid, a dielectric fluid of one or more natural esters, and/or a dielectric fluid of one or more synthetic esters.

In another aspect, a method of assembling a capacitor system includes: installing at least one capacitor pack into an interior space of a tank, the capacitor pack including a first electrode and a second electrode spatially separated from the first electrode; filling the interior space of the tank with a dielectric nanofluid that includes a base dielectric fluid and nanoparticles distributed throughout the base dielectric fluid; removing air from the interior space; and allowing the dielectric nanofluid to flow in the interior space such that the dielectric nanofluid is present throughout the interior space and between the first electrode and the second electrode.

In some implementations, the method also includes preparing the dielectric nanofluid.

In another aspect, a dielectric nanofluid for use in a power capacitor includes: a base dielectric fluid; and nanoparticles distributed throughout the base dielectric fluid. The nanoparticles are configured to increase a dielectric constant and a dielectric breakdown voltage of the base dielectric fluid.

Implementations may include one or more of the following features.

The nanoparticles may have a diameter of 30 nanometers (nm) or less, and the concentration of nanoparticles in the base dielectric fluid may be less than 0.025% by weight. The concentration of nanoparticles in the base dielectric fluid may be between 0.01% by weight and 0.025% by weight.

Implementations of any of the techniques described herein may include a capacitor system, a capacitive device, a dielectric nanofluid for a capacitor system, or a method. The details of one or more implementations are set forth in the accompanying drawings and the description below. Other features will be apparent from the description and drawings, and from the claims.

DRAWING DESCRIPTION

DETAILED DESCRIPTION

Figure 1:
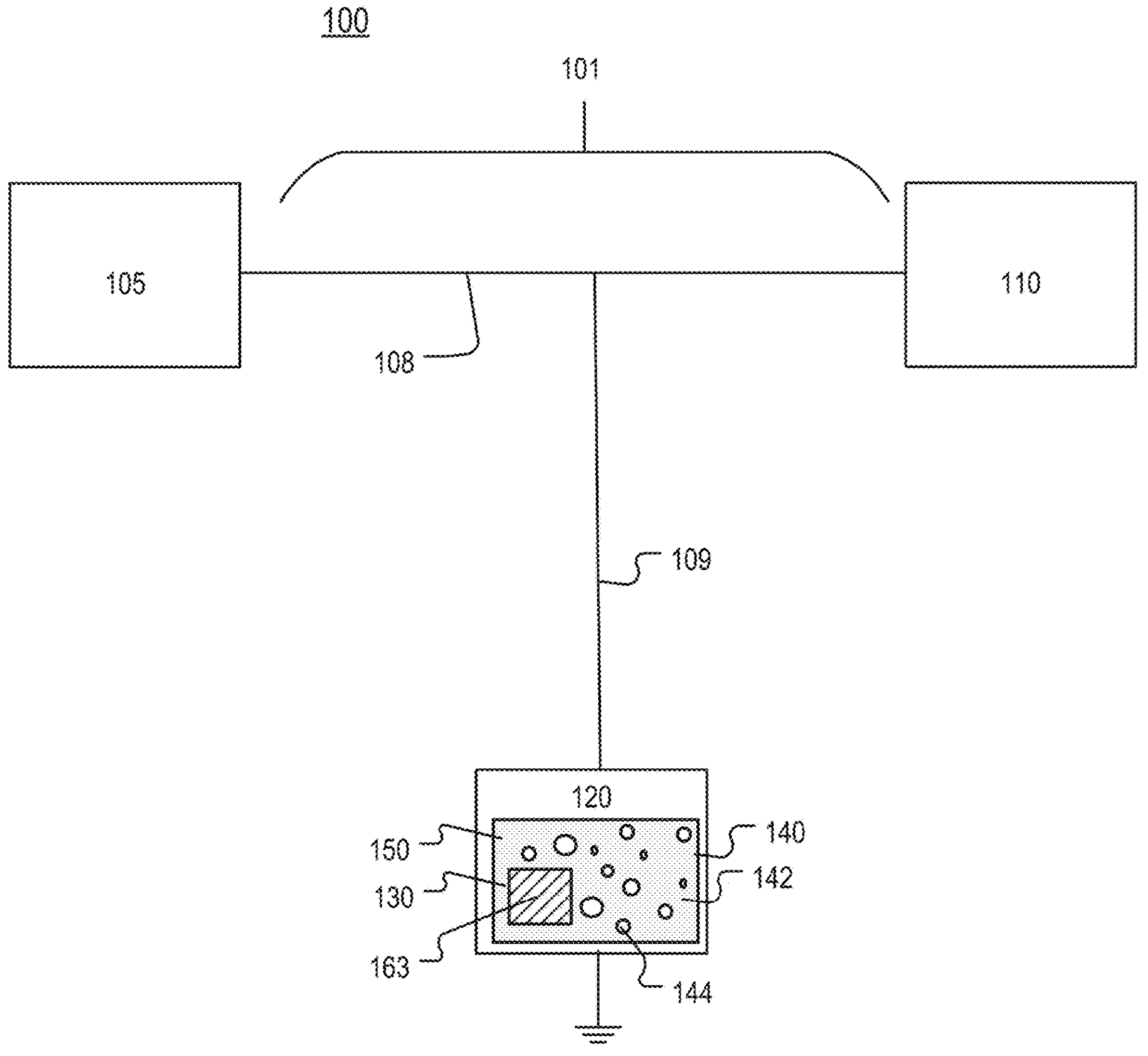
FIG. 1 is a block diagram of an example of an alternating current (AC) electrical power system.

FIG. 1 is a block diagram of an example of an alternating current (AC) electrical power system 100. The electrical power system 100 includes an electrical power distribution and transmission network 101 that carries electricity between a power source 105 and electrical loads 110 on a distribution path 108. The electrical power distribution and transmission network 101 may be, for example, an electrical grid, an electrical system, or a multi-phase electrical network that provides electricity to commercial and/or residential customers. The electrical power distribution and transmission network 101 may have an operating voltage of, for example, up to 1 kilovolt (kV), at least 1 kV, up to 34.5 kV, up to 38 kV, or 69 kV or higher, and may operate at a fundamental frequency of, for example, 50 or 60 Hertz (Hz). The distribution path 108 may include, for example, one or more transmission lines, distribution lines, electrical cables, and/or any other mechanism for distributing electricity.

The power system 100 includes a capacitor system 120 that is electrically connected to the distribution and transmission network 101 through a bus 109. The capacitor system 120 may be a capacitor bank that includes many (for example, hundreds or thousands) of individual capacitive devices 130 (only one of which is shown in FIG. 1). The capacitive devices 130 may be, for example, capacitor elements, capacitor stacks, and/or capacitor packs. An example of a capacitor pack is shown in FIGS. 2E and 2F. The capacitor system 120 may be used to provide power-factor correction in the power system 100 and/or for energy storage. The capacitor system 120 may be a power capacitor rated for use at voltages of 1 kV or greater.

The capacitor system 120 contains a dielectric system 150. The dielectric system 150 includes a dielectric nanofluid 140 that provides electrical insulation to the components in the capacitor system 120. For example, the dielectric nanofluid provides electrical insulation between the various capacitive devices 130 and between the capacitive devices 130 and other portions of the capacitor system 150. The dielectric nanofluid 140 also may seep into the capacitive devices 130. Furthermore, the capacitive devices 130 may include a dielectric material 163 (shown with diagonal shading in FIG. 1) that provides electrical insulation for the internal components of the capacitive device 130. In implementations in which the capacitive devices 130 include the dielectric material 163, the dielectric system 150 includes the dielectric nanofluid 140 and the dielectric material 163. However, the dielectric system 150 does not necessarily include the dielectric material 163, and the capacitor system 120 may be implemented without the dielectric material 163.

The dielectric nanofluid 140 includes a base dielectric fluid 142 and nanoparticles 144. As discussed in greater detail below, the presence of the nanoparticles 144 improves the performance of the capacitor system 120 as compared to a capacitor system that uses a dielectric fluid and/or a dielectric system that does not include the nanoparticles 144. For example, compared to the base dielectric fluid 142, the nanofluid 140 has a higher breakdown voltage. The breakdown voltage is the minimum voltage that causes an insulator to become electrically conductive. By increasing the breakdown voltage, the dielectric nanofluid 140 enables the capacitor system 120 to have a higher rated voltage. In some implementations, the dielectric nanofluid 140 increases the breakdown voltage by 40% to 60% as compared to the base dielectric fluid 142 alone. Furthermore, depending on the specific configuration of the nanofluid 140, the dielectric loss of the nanofluid 140 may be equal to or less than the dielectric loss of a dielectric fluid that does not include the nanoparticles 144.

Additionally, the nanofluid 140 improves the partial discharge characteristics of the capacitor system 120. For example, as compared to the base dielectric fluid 142 without the nanoparticles 144, the dielectric nanofluid 140 has a higher partial discharge inception voltage (PDIV). In some implementations, the PDIV of the dielectric nanofluid 140 is 10% greater than the PDIV of the base dielectric fluid 142. The higher PDIV means that, as compared to a capacitor system filled with a dielectric fluid that lacks the nanoparticles 144, higher voltages may be applied to the capacitor system 120. Furthermore, the improved PDIV results in the dielectric nanofluid 140 having a higher energy density than the base dielectric fluid 142 alone. This allows the capacitor system 120 to have a smaller volume than a capacitor system of the same voltage rating that does not include the nanofluid 140.

Figure 2A:
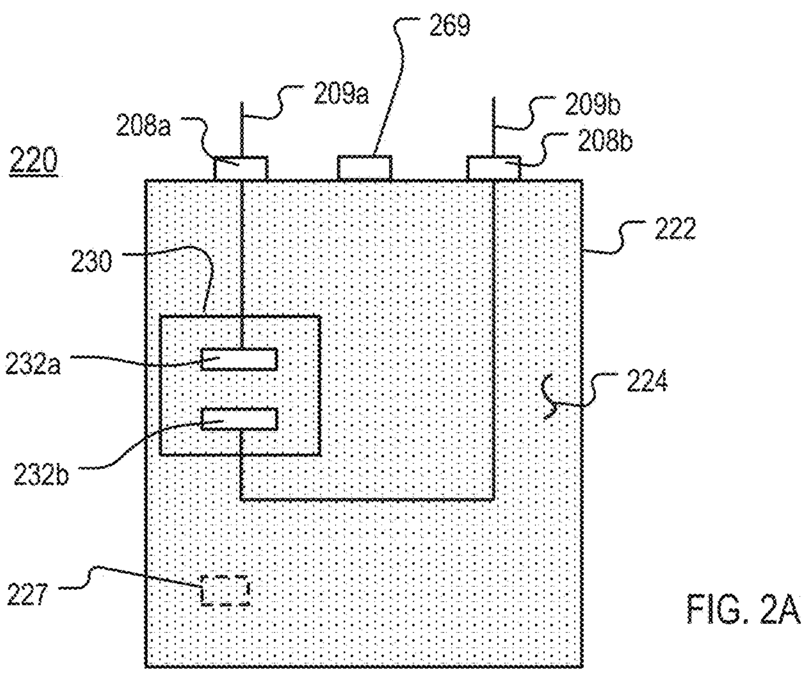
FIG. 2A is a block diagram of an example of a capacitor system.

FIG. 2A is a block diagram of a capacitor system 220. The capacitor system 220 is an example of an implementation of the capacitor system 120 (FIG. 1), and the capacitor system 220 may be used in the electrical power system 100. The capacitor system 220 may be a power capacitor rated for use at AC voltages of 1 kV or greater.

The capacitor system 220 includes a body 222 that defines an enclosed interior space 224. There is at least one capacitive device 230 in the interior space 224. Although only one capacitive device 230 is shown in FIG. 2A, the capacitor system 220 may include more than one capacitive device 230 and may include hundreds or thousands of capacitive devices 230 (or more) that are electrically connected to each other in series or parallel. The interior space 224 is filled with a dielectric nanofluid 240 via a port 269. The port 269 is open to an exterior of the body 222 and is in fluid communication with the interior space 224. The port 269 may be, for example, a tube or other conduit. After receiving the dielectric nanofluid 240, the body 222 is sealed in a manner that prevents air and other gasses and fluids from entering the interior space 224 and also prevents the dielectric nanofluid 240 from leaving the interior space 224. For example, the body 222 may be hermetically sealed.

The body 222 is made of a solid and durable material. For example, the body 222 may be steel, stainless steel, a metal alloy, or another rugged metallic material. Non-metallic materials that are durable also may be used for the body 222. The body 222 is a three-dimensional object. FIG. 2B is a perspective view of the body 222. In the example of FIG. 2B, the body 222 is a parallelepiped (a body with six walls, with each wall being a parallelogram), with three of the six walls of the body 222 labeled: walls 225*a*, 225*b*, and 225*c*.

Each of the three walls 225a, 225b, and 225c has a corresponding identically shaped wall that is on an opposite side of the body 222. The body 222 may have other shapes.

Figure 2C:
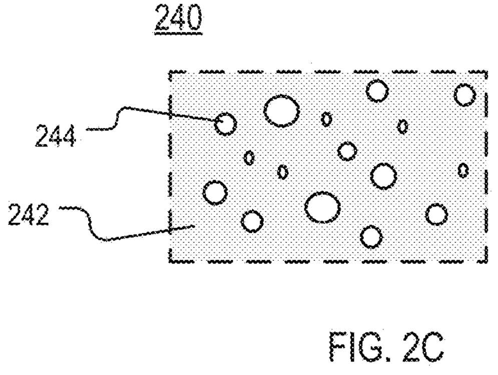
FIG. 2C is an illustration of an example of a dielectric nanofluid.

FIG. 2C is an illustration of the dielectric nanofluid 240 in a portion of the interior space 224 indicated by the inset labeled 227. The inset 227 is outlined with a dashed line, but the dashed line does not necessarily represent a physical structure in the interior space 224. The dielectric nanofluid 240 includes a base dielectric fluid 242 and nanoparticles 244 that are distributed throughout the base dielectric fluid 242.

The base dielectric fluid 242 is an electrically insulating fluid that is or includes a flowable liquid. Any electrically insulating fluid may be used as the base dielectric fluid 242. Examples of the base dielectric fluid 242 include, without limitation, mineral oil; caster oil; silicon oil; benzene; (phenylethyl)benzene; benzene, methyl(phenylmethyl); benzene, ethylenated, residues; monobenzyl toluene; dibenzyl toluene; liquefied gases (for example, liquefied helium); purified water; polychlororinated biphenyls; any type of dielectric fluid that may be considered to be a green or environmentally friendly fluid, such as, for example, a seed-based fluid, water-based fluid, a plant-based fluid, and/or a non-toxic synthetic fluid; fluids made of natural esters (for example, FR3 natural ester dielectric fluid, available from Cargill, Inc.; soybean or canola oil; Methyl ester of natural oils); fluids made of synthetic esters (for example, MIDEL 7131, available from M&I Materials Limited); any type of capacitor fluid or transformer fluid; and proprietary dielectric fluids, such as EDISOL VI, available from Eaton Corporation. A combination or mixture of one or more such fluids may be used as the base dielectric fluid 242.

Moreover, the base dielectric fluid 242 also may include additives that are known in the art but are not nanoparticles that have the characteristics of the nanoparticles 244. For example, the base dielectric fluid 242 may include additives and substances that are added to a dielectric fluid as a fluid concentrate and are dissolved in the base dielectric fluid 242 but are not distributed throughout the dielectric fluid as particles. An example of such an additive are liquid concentrates of aromatic organic compounds. These additives are not nanoparticles such as the nanoparticles 244. Furthermore, the base dielectric fluid 242 may include trace or small amounts of impurities that unintentionally arise due to, for example, the process of manufacturing the fluid 242.

The nanoparticles 244 are discrete particles and/or clusters of particulate matter that are dispersed and/or suspended throughout the base dielectric fluid 242. The nanoparticles 244 may be a dielectric or semiconductive material. Examples of the material of the nanoparticles 244 include any metal oxide or ceramics. Specific examples of materials that may be used for the nanoparticles 244 include, without limitation, titanium dioxide ($TiO_2$), aluminum dioxide ($Al_2O_3$), iron oxide ($Fe_2O_3$), barium titanate ($BaTiO_3$), magnesium oxide (MgO), gallium nitride (GaN), gallium phosphide (GaP), indium phosphide (InP), indium arsenide (InAs), zinc oxide (ZnO), zinc sulfide (ZnS), cadmium sulfide (CdS), cadmium selenide (CdSe), cadmium telluride (CdTe), Silica, glass, and/or Teflon (available from Chemours Company) and other organic nanoparticles. Moreover, various forms and phases of these materials may be used. For example, the nanoparticles 244 may include anatase and/or rutile $TiO_2$. In some implementations, the nanoparticles 244 include only dielectric or semiconductive materials. In other implementations, the nanoparticles 244 may include trace or small amounts of materials that are not generally considered dielectric or semiconductive, such as, for example, traces of pure metals.

The nanoparticles 244 may be uniformly sized and/or shaped, or the sizes and/or shapes of the nanoparticles 244 may vary. For example, the nanoparticles 244 may be substantially spherical in shape with a distribution of diameters. The distribution of diameters may follow a known distribution function, such as a Gaussian distribution function. In some implementations, the nanoparticles 244 have shapes other than spherical. For example, the nanoparticles 244 may be elliptically shaped, disc-shaped, and/or needle-shaped. In another example, the nanoparticles 244 are irregularly or randomly shaped.

The nanoparticles 244 have a relatively small diameter, for example, on the order of ones or tens of nanometers. For example, in some implementations, the diameter of the nanoparticles 244 is 30 nanometers (nm) or less. In some implementations, the diameter of nanoparticles is 20 nm or less. In yet other implementations, the diameter of the nanoparticles is 15 nm or less. Regardless of the nominal diameter of the nanoparticles 244, the collection of nanoparticles 244 that are dispersed throughout the base dielectric fluid 242 may include a small number of nanoparticles that have a diameter that is greater than the nominal diameter due to variations that may occur when forming the nanoparticles 244.

Furthermore, the concentration (by weight) of nanoparticles 244 is relatively low. The concentration of the nanoparticles 244 in the dielectric nanofluid 240 is such that the nanoparticles 244 remain suspended in the base dielectric fluid 242 and do not precipitate from the dielectric nanofluid 240. If the nanoparticles 244 precipitate from the base dielectric fluid 242, the nanoparticles 244 will accumulate at the bottom of the interior space 224. The nanoparticles 244 are most effective when they are suspended and dispersed throughout the base dielectric fluid 242, thus, it is desirable that the nanoparticles 244 remain spatially dispersed in the base dielectric fluid 242. The concentration of the nanoparticles 244 in the base dielectric fluid 242 may be, for example, less than 0.1% by weight (% wt), less than 0.025% wt, less than 0.01% wt, between 0.01% wt and 0.025% wt, or between 0.1% wt and 0.005% wt.

As noted above, although only one capacitive device 230 is shown in FIG. 2A, the capacitor system 220 may include more than one capacitive device 230. There may be, for example, hundreds or thousands of capacitive devices 230 (or more) in the interior space 224 that are electrically connected to each other in series or parallel. In implementations in which the capacitor system 220 includes more than one capacitive device 230, the specific arrangement and number of capacitive devices 230 is determined by the application in which the capacitor system 220 will be used. For example, the arrangement and number of the capacitive devices 230 may be determined based on the desired voltage or reactive power demands of the particular application.

Figure 2D:
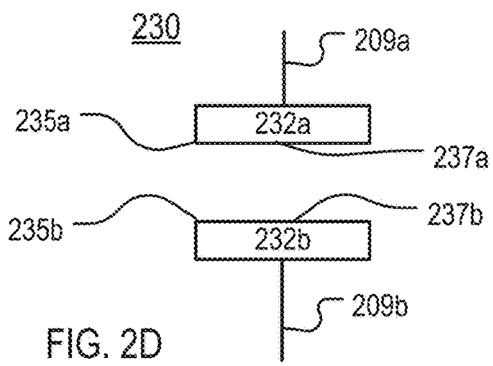
FIG. 2D is a block diagram of an example of a capacitive device.
Figure 2B:
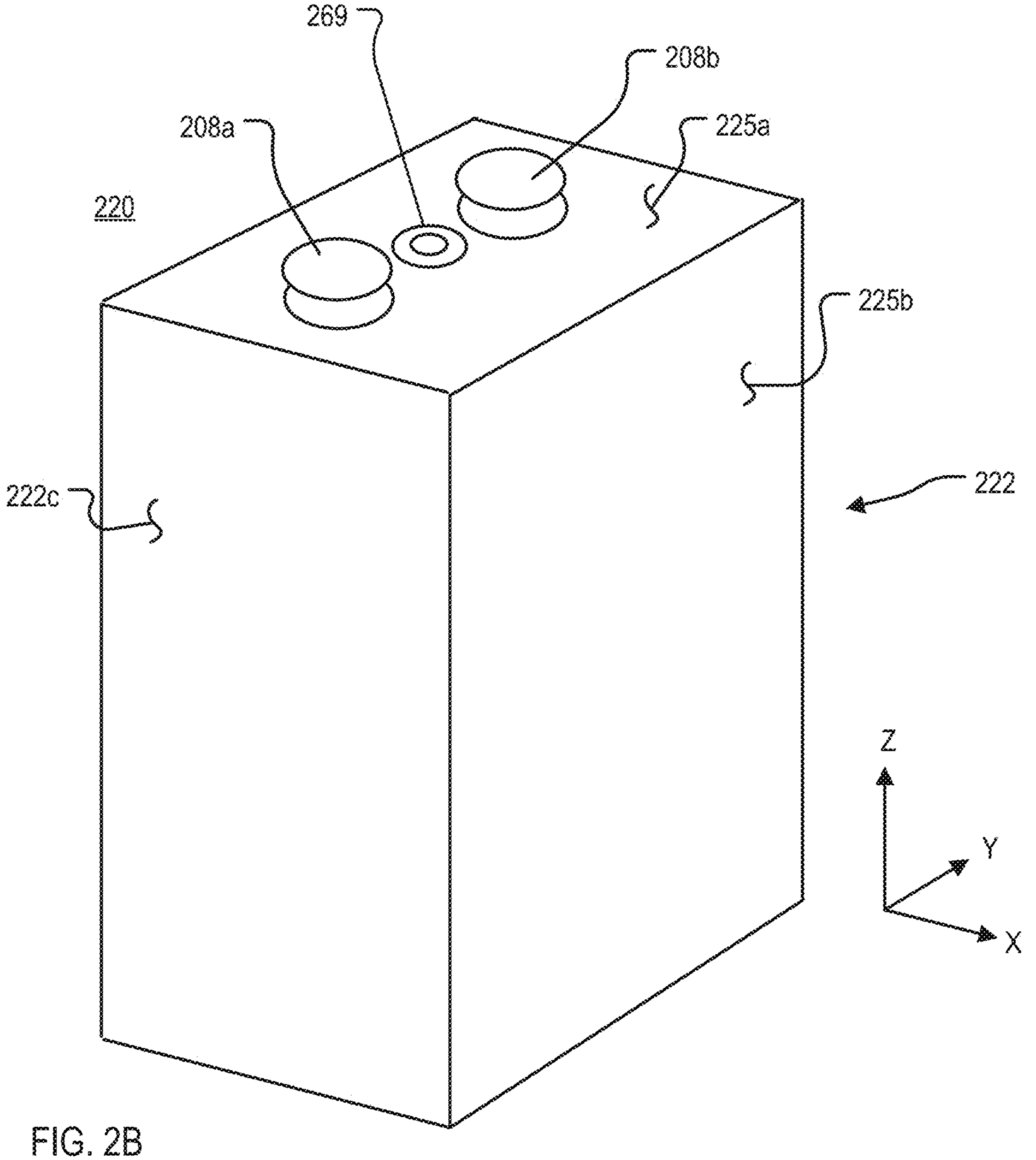
FIG. 2B is a perspective view of a body of the capacitor system of FIG. 2A.
Figure 2E:
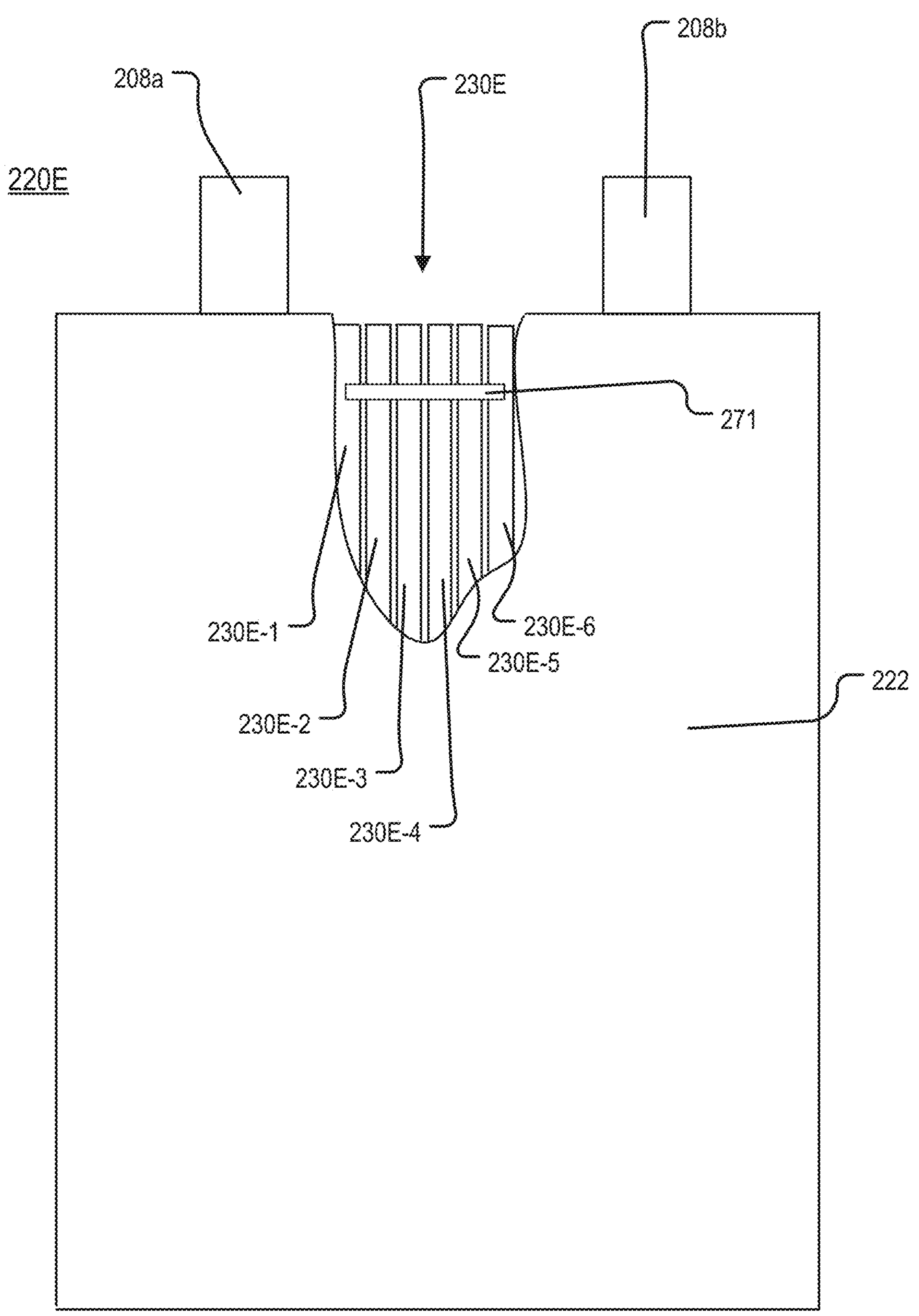
FIG. 2E is a side partial cutaway view of another example of a capacitor system.
Figure 2F:
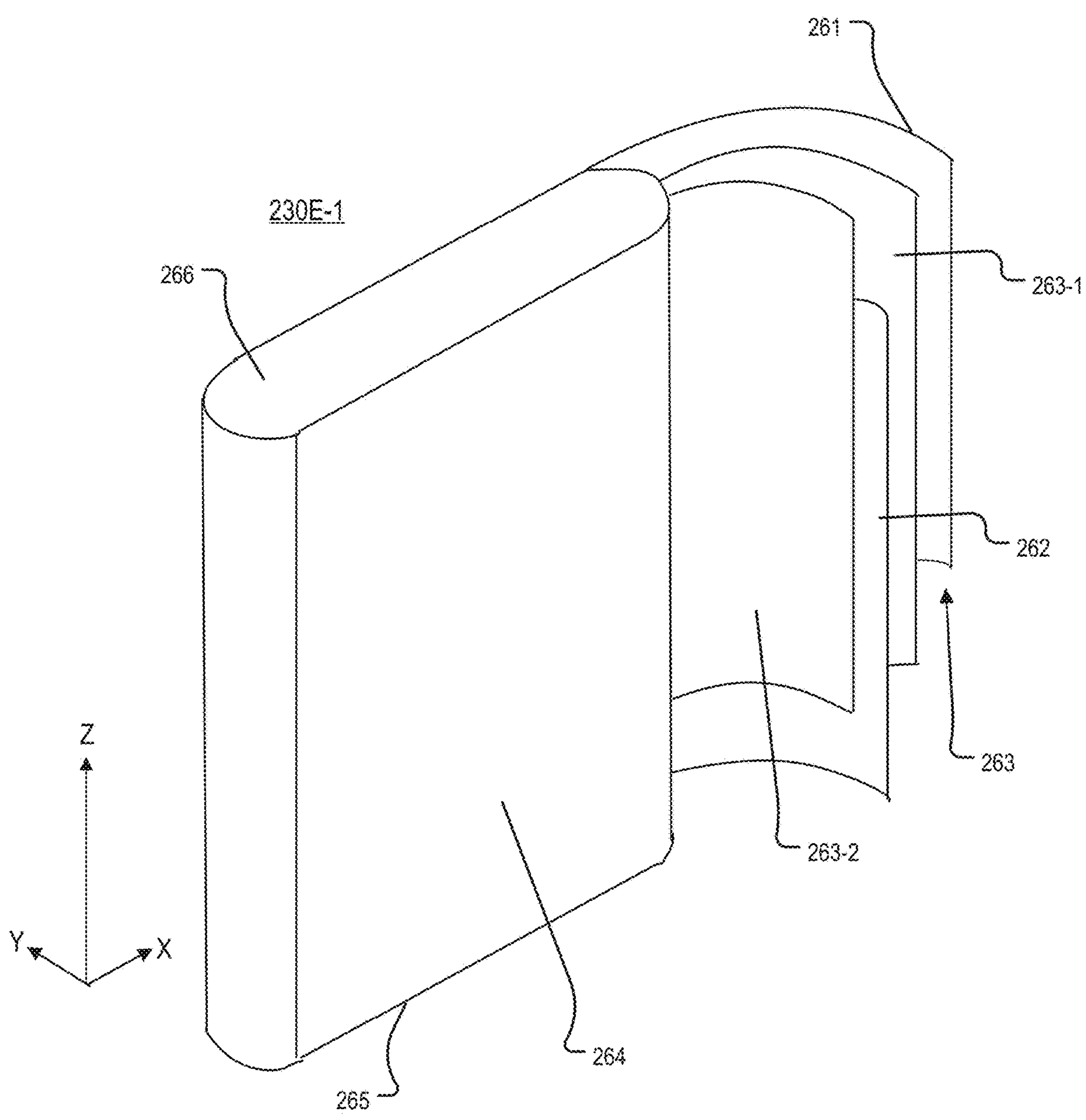
FIG. 2F is a perspective view of an example of a capacitor pack.

Referring also to FIG. 2D, which is a block diagram of the capacitive device 230, the capacitive device 230 includes a first electrode 232a and a second electrode 232b. The second electrode 232b is separated from the first electrode 232a. The first and second electrodes 232a and 232b are made of an electrically conductive material, such as metal. The first electrode 232a is electrically connected to first lead 209a, and the second electrode 232b is electrically connected to a second lead 209b. The first lead 209a and the second lead 209b pass through respective bushings 208a and 208b. The first lead 209a and the second lead 209b may be used to electrically connect the capacitive device 230 to other electrical devices, an electrical power system (such as the electrical power system 100 of FIG. 1), and/or to ground or a reference voltage.

The capacitive device 230 is depicted as a parallel plate capacitor. However, the capacitive device 230 may have other forms. For example, and referring to FIG. 2E, a capacitor pack or capacitor winding formed from multiple layers of metallic foil and a dielectric material wound together may be used as the capacitive device.

FIG. 2E is a side partial cutaway view of a capacitor system 220E. The capacitor system 220E is similar to the capacitor system 220 (FIG. 2A), except the capacitive devices of the capacitor system 220E are wound capacitor packs 230E. The capacitor packs 230E are enclosed in the body 222. The partial view of FIG. 2E shows six capacitor packs 230E-1 to 230E-6 (collectively referred to as the capacitor packs 230E), but the capacitor system 220 may include more or fewer capacitor packs. Furthermore, in the example of FIG. 2E, the capacitor packs 230E are arranged vertically in the interior 224E. However, other arrangements are possible. For example, the capacitor packs 230E may be arranged horizontally, diagonally, or in any other configuration appropriate for the application.

FIG. 2F is a perspective view of the capacitor pack 230E-1 in a partially assembled state. The capacitor pack 230E-1 includes a first electrode 261, a second electrode 262, and a dielectric material 263. The second electrode 262 is offset in the −Z direction relative to the first electrode 261 and the dielectric material 263. The first electrode 261, the second electrode 262, and the dielectric material 263 are wound to form a body 264 of the capacitor pack 230E-1 that extends in the Z direction from an end 265 to an end 266. The body 264 is three-dimensional and has a generally elliptical cross-section in the X-Y plane. Other shapes and arrangements may be used. In the example of FIG. 2F, there are two layers of the dielectric material 263, a first layer 263-1 that is between the first electrode 261 and the second electrode 262, and a second layer 263-2 that is adjacent to the second electrode 262 but is not between the first electrode 261 and the second electrode 262. Other implementations are possible. For example, the capacitor pack 230E-1 may be configured with all of the dielectric material 263 between the first electrode 261 and the second electrode 262. In some implementations, the capacitor pack 230E-1 includes three layers or portions of the dielectric material 263, with one of the layers or portions between the first electrode 261 and the second electrode 262, and the other two layers or portions being on the other side of each of the first electrode 261 and the second electrode 262.

The first electrode 261 and the second electrode 262 are an electrically conductive material that does not break when wound. For example, each of the first electrode 261 and the second electrode 262 may be a metallic foil, coating, or layer. Examples of specific metals that may be used for the electrodes 261 and 262 include, without limitation, aluminum, copper, chromium, gold, molybdenum, nickel, platinum, silver, stainless steel, titanium, and/or combinations of these or other electrically conductive materials.

The dielectric material 263 is any type of electrically insulating material. Specific examples of substances that may be used as the dielectric material 263 include, without limitation, a film of polypropylene, polyethylene, polyester, polycarbonate, polyethylene terephthalate, polyvinylidene fluoride, polysulfone, polystyrene, polyphenylene sulfide, polytetrafluoroethylene, and/or similar polymers. Other materials may be used. For example, the dielectric material 263 may be an electrically insulating paper (such as craft paper). Moreover, the dielectric material 263 may take other forms. For example, the dielectric material 263 may be a fluid or a gel. Furthermore, the surface of the dielectric material 263 may have irregularities or deformations sufficient to allow the dielectric fluid 240 to penetrate the wound pack and to impregnate the spaces between the electrodes 261 and 262 and the dielectric material 263.

Referring again to FIG. 2E, the assembled capacitor packs 230E-1 to 230E-6 are held together by a fastener 271. The fastener 271 is any type of mechanism that is capable of holding the capacitor packs 230E-1 to 230E-6 together. The fastener 271 may be, for example, a crimp or other type of mechanical fastener. Other types of connections may be used as the fastener 217. For example, the fastener 271 may be a soldered, welded, or brazed connection; or bonded connection formed by, for example, an adhesive. A combination of different types of fasteners may be used. Furthermore, although the fastener 271 is illustrated as a single fastener, more than one fastener may be used. For example, a separate fastener may be used to join each capacitor pack to an adjacent capacitor pack. Moreover, one or more fasteners may be used to mount the capacitor packs 230E to an interior wall or mount of the body 222.

The interior space 224 is filled with the dielectric fluid 240. The dielectric fluid 240 flows in the spaces between adjacent capacitor packs 230E and also may seep into or penetrate the capacitor packs 230E. The dielectric fluid 240 and the dielectric material 263 are a dielectric system that provides insulation to the capacitor packs 230E and the capacitor system 220E.

The dielectric fluid 240 may be used in capacitor systems other than the systems 220 and 220E, and these other capacitor systems may include implementations that use capacitive devices in a different form than the devices 230 and 230E. For example, the capacitive device may have a stack configuration in which the electrodes 261, 262 and the dielectric material 263 are stacked but are not wound.

The electrodes 232*a* and 232*b* and the electrodes 261 and 262 may be laser cut, mechanically cut, or folded after being mechanical cut (for example, a folded edge mechanically cut foil). A laser cut electrode is formed by cutting the electrode from a larger piece or sheet of electrically conductive material using a laser that has sufficient intensity to cut through and separate the material. A mechanically cut electrode is formed by cutting a piece or sheet of electrically conductive material with a mechanical device, such as a blade or metal edge. Mechanically cut electrodes are cheaper and easier to manufacture. However, the edges of a mechanically cut electrode tend to be rougher and more irregular than the edges of an electrode that is formed with a laser. The irregular and/or rough edges increase the likelihood for partial discharge events at the edges of the electrode. A partial discharge is a localized dielectric breakdown of a portion of a dielectric under voltage stress. A partial discharge does not cause direct electrical conduction between electrodes that are separated by the dielectric material. However, partial discharges cause wear on the dielectric insulation and reduce the lifetime of the capacitive device. Moreover, partial discharges that occur on the edges of the electrodes may lead to damage to the entire capacitor system.

Because the rough and/or irregular edges of electrodes that are formed mechanically can increase the likelihood of partial discharge events, traditional capacitor systems include capacitive devices with laser-cut electrodes (such as laser-cut metallic foils) or folded edge mechanically cut electrodes (such as foil). Some traditional capacitor systems employ folded edge mechanically cut electrodes to mitigate the effects of the rough and/or irregular edges caused by mechanically cutting the electrode material. A folded edge mechanically cut electrode is formed by folding the mechanically cut conductive material (for example, metallic foil) and orienting the electrode such that the folded region forms the edge of the electrode. The fold creates a more uniform surface for the electrode edge. However, the folded electrode may add design complexity and has a greater thickness than an un-folded edge, thus taking up more space and making the capacitor system larger.

Figures 6A, 6B:
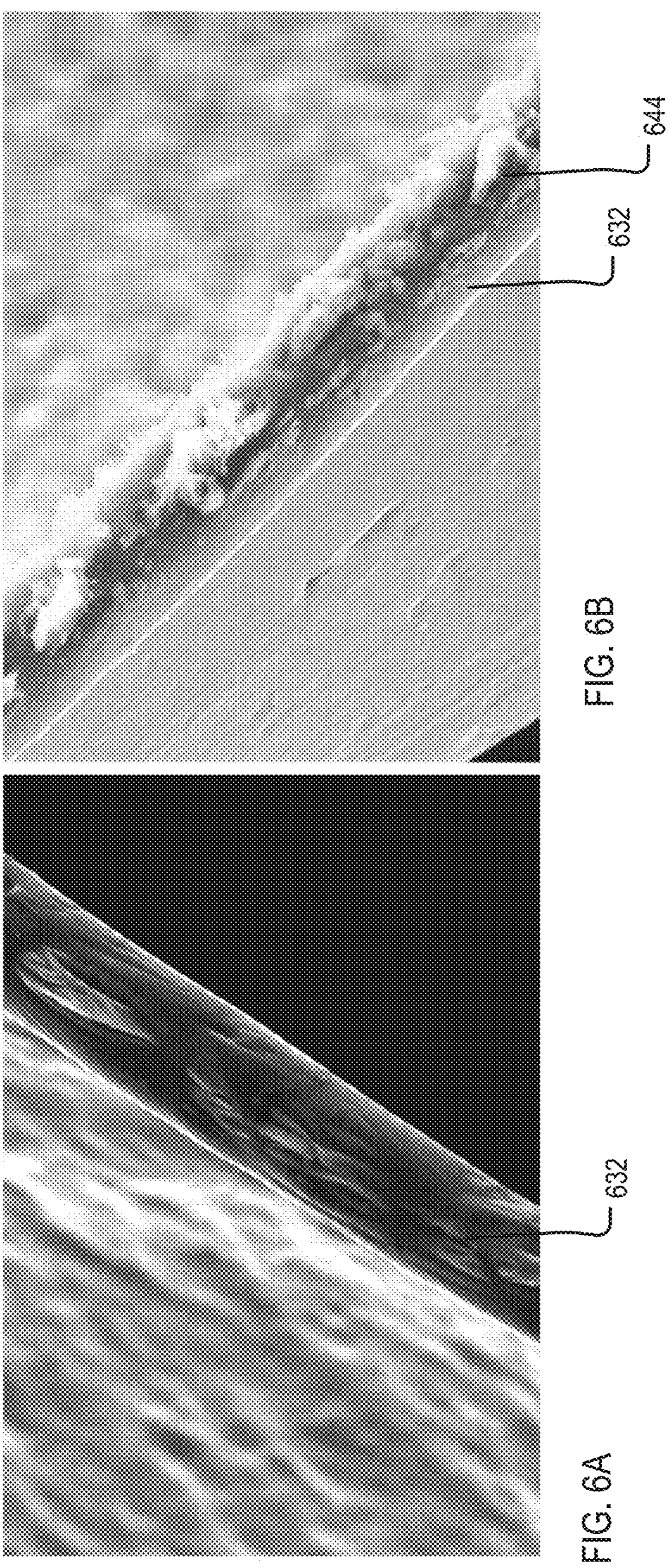
FIGS. 6A and 6B are scanning electron microscope photographs of an edge of an aluminum foil electrode.

On the other hand, the capacitor system 220 and the capacitor system 220E, which are filled with the dielectric nanofluid 240 that includes the nanoparticles 244, may use laser cut or mechanically cut electrodes (with or without a folded edge) because the nanoparticles 244 decrease the occurrence of partial discharges. For example, the nanoparticles 244 may form a coating on the electrodes 232*a* and 232*b* (including on the edges of the electrodes 232*a* and 232*b*), and the coating prevents or reduces partial discharge on and/or near the electrodes 232*a* and 232*b*. FIG. 6B shows an example of such a coating. Due to the reduced or eliminated partial discharge around the electrodes 232*a* and 232*b*, the electrodes 232*a* and 232*b* may be formed of mechanically cut material (such as a mechanically cut metallic foil). Similarly, the electrodes 261 and 262 (FIG. 2F) may be laser cut or mechanically cut metallic material.

Regardless of whether the electrodes 232*a* and 232*b* are laser cut or mechanically cut, the reduction or elimination of partial discharge from the edges 235*a* and 235*b* of the respective electrodes 232*a* and 232*b* provided by the dielectric nanofluid 240 also increases the reliability of the capacitor system 220 by causing the failure mode to be in respective active areas 237*a* and 237*b* of the electrodes 232*a* and 232*b* instead of at the respective edges 235*a* and 235*b*. The active areas 237*a* and 237*b* are the portions of the respective electrodes 232*a* and 232*b* that face each other and are away from the edges 235*a* and 235*b*. Discharge events that occur in the active areas 237*a* and/or 237*b* may damage an individual capacitive device 230 but are less likely to damage nearby elements. Thus, having the failure mode (for example, discharge events) in the active areas 237*a* and 237*b* improves the performance and increases the lifetime of the capacitive system 220 as compared to a legacy system that does not include the dielectric nanofluid 240.

A similar reduction or elimination of partial discharges from the edges of the electrodes 261 and 262 is achieved, regardless of whether the electrodes 261 and 262 are mechanically cut or laser cut. Thus, the use of the dielectric nanofluid 240 in the capacitor system 220E results in a similar performance enhancement for the electrodes 261 and 262 and for the capacitor system 220E (FIG. 2E).

Figure 3:
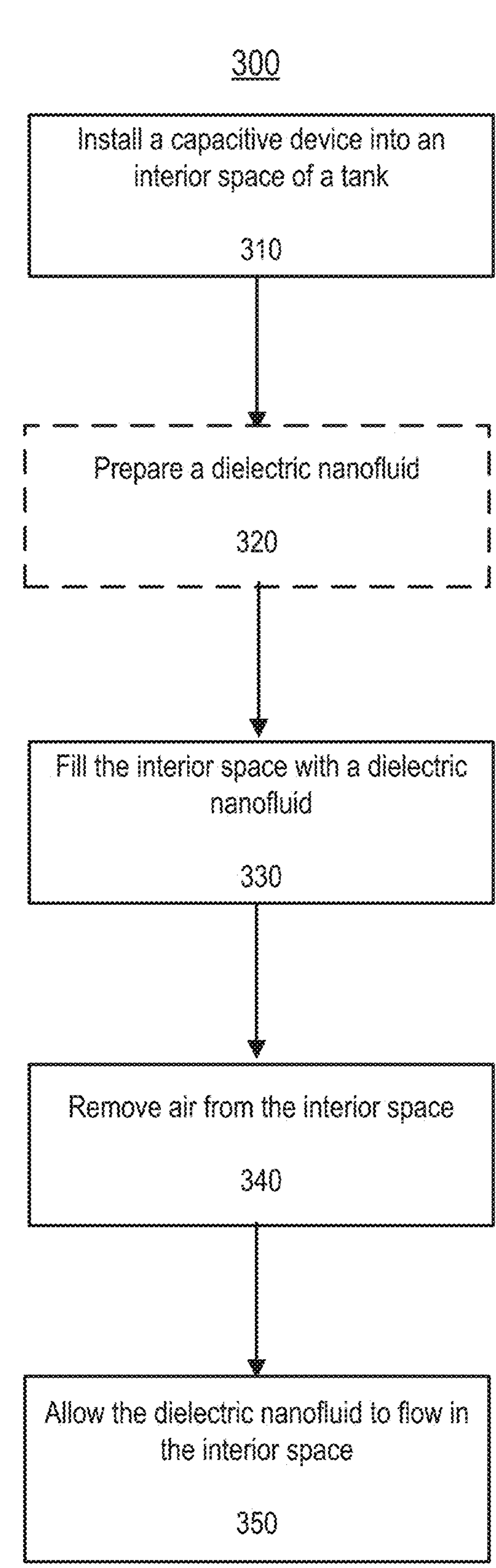
FIG. 3 is a flow chart of an example of a process for assembling a capacitor system that uses a dielectric nanofluid.

FIG. 3 is a flow chart of a process 300. The process 300 is an example of a process for assembling a capacitor system that uses the dielectric nanofluid 140 or 240. The process 300 is discussed with respect to the capacitor system 220. However, the process 300 may be used to assemble other capacitor systems, such as the capacitor system 220E (FIG. 2E) or the capacitor system 120 (FIG. 1).

The capacitive device 230 is installed into the interior space 224 of the body 222 (310). The body 222 may be referred to with other terms, for example, the body 222 may be referred to as a tank, cabinet, or housing. More than one capacitive device 230 may be installed into the interior space 224. For example, hundreds, thousands, or more capacitive devices 230 may be installed into the body 222 to form a capacitor bank. In these implementations, installing the capacitive device 230 also may include electrically connecting the various capacitive devices 230 to each other. In some implementations, some or all of the capacitive devices are pre-wired and are installed into the interior space 224 as a pre-wired and pre-connected assembly. The capacitive devices 230 may be mechanically mounted to the body 222 and/or to other capacitive devices 230. Furthermore, other electrical and/or mechanical elements also may be installed into the interior space 224. Examples of other electrical and/or mechanical elements include fuses, breakers, sensors, controllers, communication devices, brackets and other mounting devices, solid insulation, and/or dampeners.

The dielectric nanofluid 240 is prepared (320). Preparation of the dielectric nanofluid 240 may occur before the process 300 or during the process 300. Thus, the preparation of the dielectric nanofluid 240 is an optional part of the process 300, and the process 300 may be performed without preparing the dielectric nanofluid 240. In implementations in which preparation of the dielectric nanofluid 240 is not part of the process 300, the process 300 may use a dielectric nanofluid 240 that was pre-prepared prior to beginning the process 300.

To prepare the dielectric nanofluid 240, the nanoparticles 244 are combined with the base dielectric fluid 242. The nanoparticles 244 may be added to the base dielectric fluid 242 by dispersing the nanoparticles in the base dielectric fluid 242. Alternatively or additionally, a dispersion of nanoparticles 244 in an amount of base dielectric fluid 242 may be diluted with additional base dielectric fluid 242. Nanoparticles 244 or base dielectric fluid 242 is added until the concentration of the nanoparticles is appropriate for the application in which the dielectric nanofluid 240 will be used. The base dielectric fluid 242 and the nanoparticles 244 may be combined with the nanoparticles 244 suspended in the base dielectric fluid 242 by inserting an ultrasonic probe into the mixture and stirring.

The interior space 224 is filled with the dielectric nanofluid 240 (330). The dielectric nanofluid 240 may be delivered to the interior space 224 by any mechanism. For example, the dielectric nanofluid 240 may be pumped into the interior space 224 or poured into the interior space 224 via the port 269. After the interior space 224 is filled with the dielectric nanofluid 240, the body 222 is hermetically sealed, and air is removed from the interior space 224 (for example, by pulling a vacuum) (340).

After the air is removed from the interior space 224, the dielectric nanofluid 240 is allowed to flow in the interior space 224 (350). The dielectric nanofluid 240 flows throughout the interior space 224 and between the electrodes 223*a* and 223*b* of each capacitive device 230. In implementations in which a winding or pack such as the capacitive pack 230E (FIG. 2E) is enclosed in the body 222, the dielectric nanofluid 240 may seep into the packs 230E such that the dielectric nanofluid 240 is between the electrodes 261 and 262 and the dielectric material 263.

Figure 4:
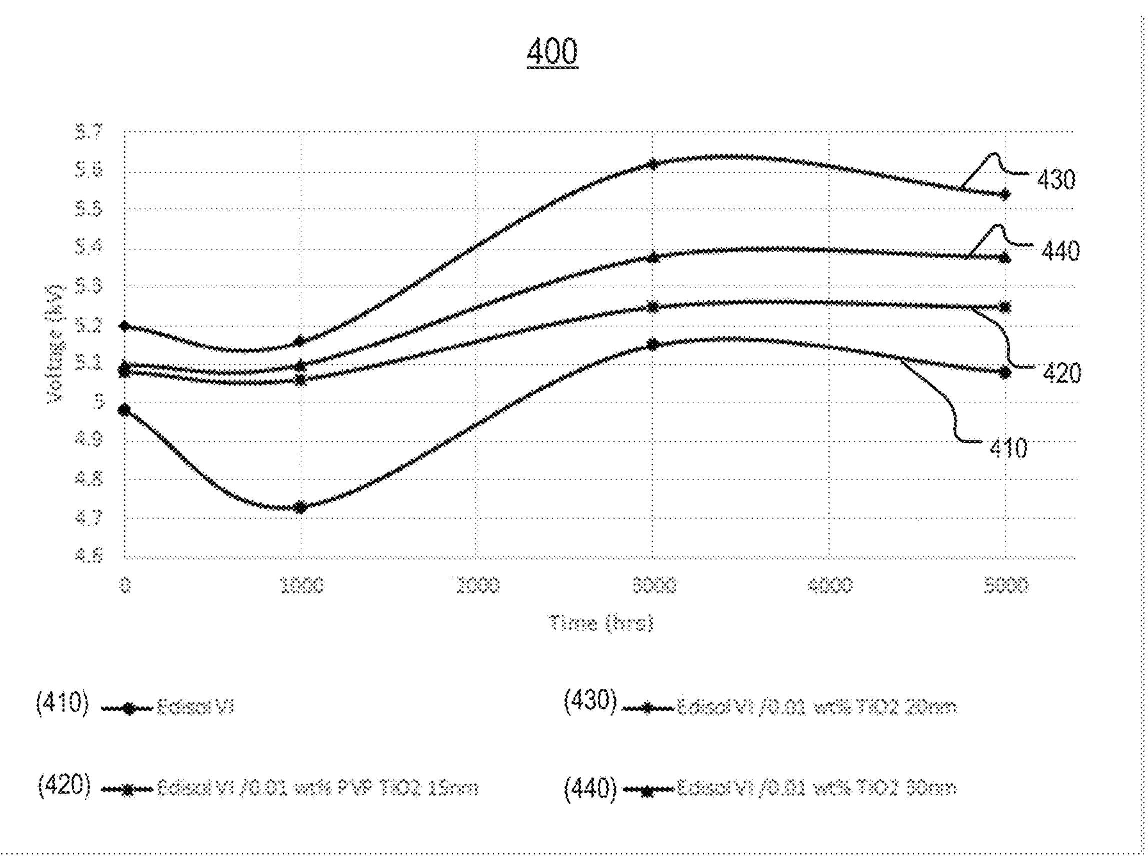
FIG. 4 is a plot of experimental data showing discharge inception voltage (DIV) in kilovolts (kV) as a function of time (in hours).

FIG. 4 is a plot 400 of experimental data showing discharge inception voltage (DIV) in kilovolts (kV) as a function of time (in hours) for a single-component capacitor system, which is a capacitor system that includes one wound capacitor pack. An AC voltage with an amplitude of 2.2 kV was applied to the capacitor system to collect the data shown in the plot 400. The data 410 shows the DIV for the capacitor system filled with Edisol VI dielectric fluid without any nanoparticles as a function of time. The data 420, 430, and 440 show DIV for the capacitor system filled with Edisol VI dielectric fluid with 0.01% wt $TiO_2$ nanoparticles with nanoparticle diameters of 15 nm, 20 nm, and 30 nm, respectively, as a function of time. As shown, the DIV is the lowest for the capacitor system filled with Edisol VI alone (data 410). Thus, the presence of the nanoparticles 244 increases the DIV. An increased DIV allows an increased operating voltage for a capacitor system and thus improves the performance of the capacitor system. Of the results shown in FIG. 4, the dielectric nanofluid with the 20 nm nanoparticle diameter (data 440) had the highest DIV and thus performed the best. However, all of the dielectric nanofluids (data 420, 430, 440) resulted in higher DIVs than the Edisol VI alone.

Figure 5:
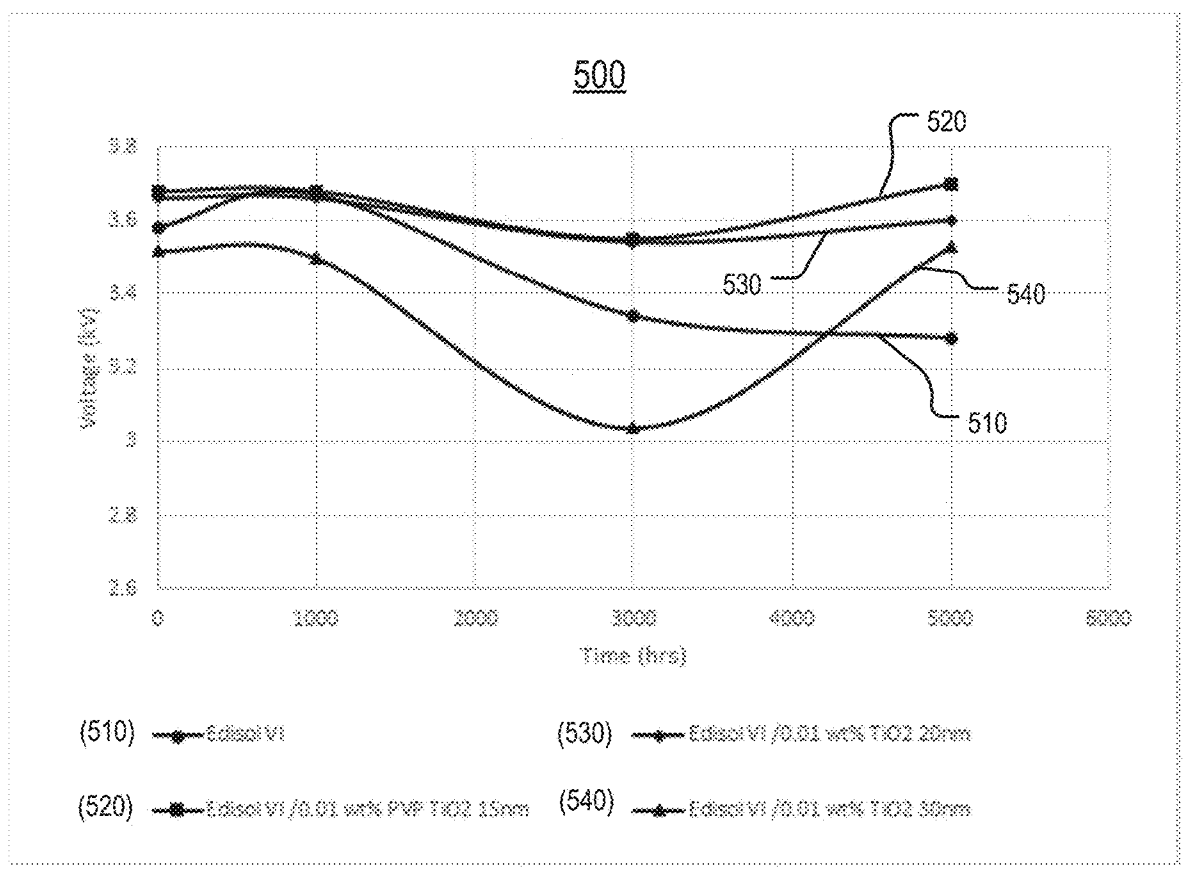
FIG. 5 is a plot of experimental data showing the partial discharge extinction voltage (DEV) in kilovolts (kV) as a function of time (in hours).

FIG. 5 is a plot 500 of experimental data showing the partial discharge extinction voltage (DEV) in kilovolts (kV) as a function of time (in hours). The DEV is the voltage at which repetitive partial discharges cease to occur when the test voltage is gradually decreased from a value higher than the discharge inception voltage (DIV). A higher DEV is desirable.

The data 510 shows the DEV for a single-component capacitor system filled with Edisol VI dielectric fluid that does not include nanoparticles. The data 520, 530, and 540 show DEV for the capacitor system filled with Edisol VI dielectric fluid with 0.01% wt $TiO_2$ nanoparticles with nanoparticle diameters of 15 nm, 20 nm, and 30 nm, respectively. An AC voltage of with an amplitude of 2.2 kV was applied to collect the data 510, 520, 530, 540.

As shown, the DEV is the highest for the capacitor system filled with the dielectric nanofluid with the 15 nm diameter nanoparticles (data 520), and the capacitor system filled with the dielectric nanofluid with the 20 nm diameter nanoparticles (data 530) is very similar to the DEV of the data 520. After prolonged usage, the lowest DEV is for the Edisol VI alone (data 510). The plot 500 again shows the improvement obtained by using the dielectric nanofluid. The plots 400 and 500 also show that the performance enhancement provided by the dielectric nanofluid lasts for a substantial amount of time (5000 hours in the examples shown).

FIGS. 6A and 6B are scanning electron microscope photographs of an edge of an aluminum foil electrode 632. FIG. 6A shows the aluminum foil electrode 632 prior to use in a dielectric nanofluid. FIG. 6B shows the aluminum foil electrode 632 after 5000 hours of use in a single-component capacitor system that included a dielectric nanofluid with $TiO_2$ nanoparticles 644. An AC voltage with an amplitude of 2.2 kV was applied to the capacitor system. As shown in FIG. 6B, the nanoparticles 644 formed a coating on the electrode 632. As discussed above, this coating may decrease or eliminate partial discharges at the edge of the electrode 632.

Figure 7:
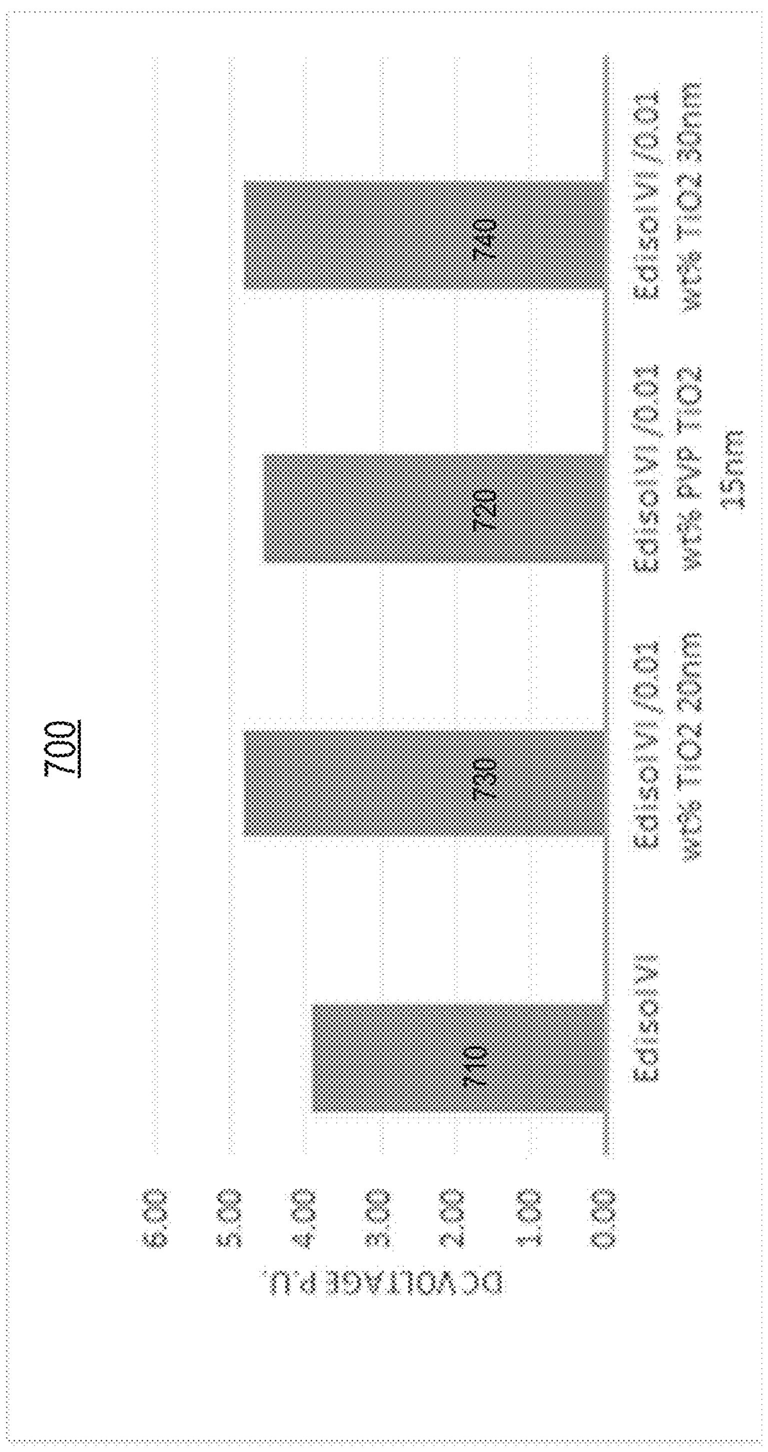
FIG. 7 is a bar chart that represents results from an AC-DC test.

FIG. 7 is a bar chart 700 that represents results from an AC-DC test. During the AC-DC test, the applied voltage alternated at fixed intervals between an AC voltage and a DC voltage. The applied AC voltage had a constant amplitude (2.2 kV), frequency, and phase during the test. During the test, the DC voltage signal was increased until the capacitive devices under test failed in a 100% open failure mode. A 100% open failure mode is when the capacitive device acts as an open circuit and the conductivity is zero or nearly zero. A capacitive device with a higher AC-DC test voltage is considered more robust than a capacitive device with a lower AC-DC test voltage.

In FIG. 7, the height of each bar 710, 720, 730, 740 represents the highest per unit (P.U.) value that the capacitor system withstood before the capacitive devices failed in 100% open failure mode after 5000 hours of use. The applied DC voltage is determined by taking the amplitude of the applied AC voltage (2.2 kV in this example) and multiplying by the per unit value. To collect the data shown in FIG. 7, the per unit value, and therefore the DC voltage, was incrementally increased until the capacitor system (the device under test) failed. The bar 710 represents the results for a capacitive system filled with Edisol VI and no nanoparticles. The bars 720, 730, and 740 represent results the same capacitive system filed with a dielectric nanofluid that included Edisol VI and 0.01% wt $TiO_2$ nanoparticles with diameters of 15 nm, 20 nm, and 30 nm, respectively. The highest per unit value for the capacitor system filled with Edisol VI (bar 710) was 3.94. The corresponding maximum DC voltage was 8.66 kV, which is determined by multiplying the amplitude of the applied AC voltage (2.2 kV) by the per unit value (3.94). The highest per unit value for the capacitor system filed with Edisol VI and 0.01% wt $TiO_2$ nanoparticles of diameter 15 nm, 20 nm, and 30 nm was 4.58, 4.83, and 4.84, respectively. Thus, all of the Edisol VI-based nanofluids shown in FIG. 7 achieved a higher per unit value (and thus can withstand the application of a greater maximum DC voltage) than the Edisol VI alone. The Edisol VI-based nanofluid with 20 nm diameter nanoparticles and 30 nm diameter nanoparticles had the highest per unit values of 4.83 and 4.84, respectively. The Edisol VI-based nanofluid with the 30 nm diameter nanoparticles (bar 740) showed about a 22% improvement over the Edisol VI fluid alone (bar 710). Moreover, all of the tested capacitor systems that included nanofluid failed open. As compared to failing closed, a capacitor system that fails open generally provides a safety and operational benefit.

Figure 8:
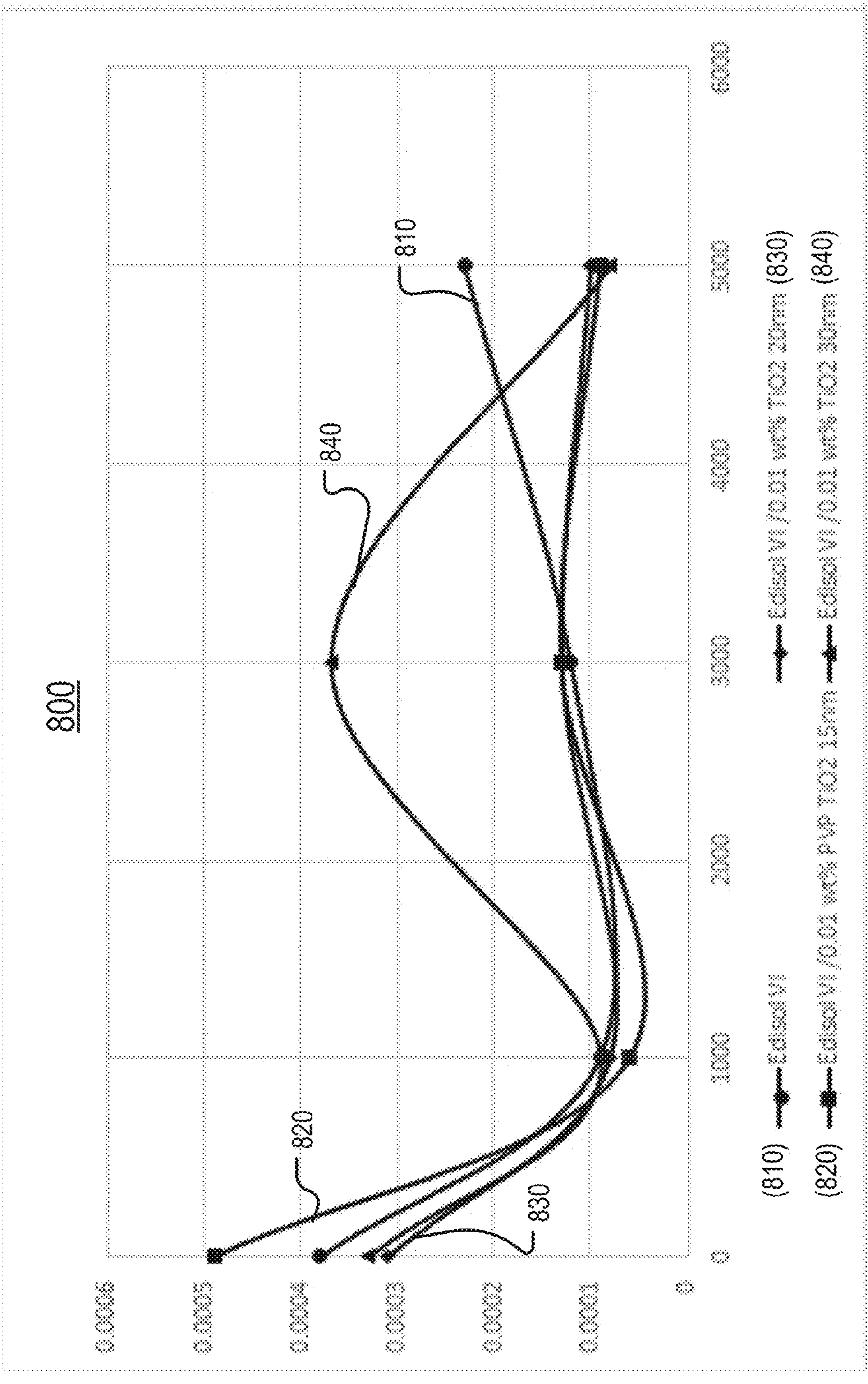
FIG. 8 is a plot of dielectric loss as a function of time (in hours).

FIG. 8 is a plot 800 of dielectric loss as a function of time (in hours). In FIG. 8, the curve 810 represents the dielectric loss as a function of time for Edisol VI (without nanoparticles). The curve 820 represents the dielectric loss as a function of time for Edisol VI with 0.01% wt of $TiO_2$ nanoparticles that had a maximum diameter of 15 nm. The curve 830 represents the dielectric loss as a function of time for Edisol VI with 0.01% wt of $TiO_2$ nanoparticles that had a maximum diameter of 20 nm. As shown, the dielectric loss of the nanofluids (curves 820 and 830) is comparable to the Edisol VI alone, and is better after prolonged usage.

The implementations discussed above and other implementations are within the scope of the claims.

What is claimed is:

1. A power capacitor comprising:

a tank that defines an interior space;

at least one capacitive device in the interior space, the at least one capacitive device comprising:

a capacitor body;

a first electrode in the capacitor body, the first electrode comprising a first active area having a first edge;

a second electrode in the capacitor body, the second electrode separated from the first electrode in a first direction and offset from the first electrode in a second direction, the second electrode comprising a second active area having a second edge, wherein the first active area faces the second active area, the second electrode overlaps the first edge, and the first electrode overlaps the second edge; and a film of electrically insulating material between the first electrode and the second electrode, the film comprising a first surface that faces the first electrode and a second surface that faces the second electrode; and wherein the power capacitor further comprises:

a dielectric nanofluid, wherein the dielectric nanofluid is in direct contact with the first active area of the first electrode and the first surface of the film and in direct contact with the second active area of the second electrode and the second surface of the film, the dielectric nanofluid comprising:

a base dielectric fluid; and nanoparticles dispersed in the base dielectric fluid, wherein the concentration of the nanoparticles in the base dielectric fluid is less than 0.1% by weight, the nanoparticles coat the first edge and the second edge to thereby reduce partial discharge events at the first edge and the second edge, and a breakdown voltage of the dielectric nanofluid is greater than a breakdown voltage of the base dielectric fluid.

2. The power capacitor of claim 1, wherein the nanoparticles comprise particles of a dielectric material.

3. The power capacitor of claim 1, wherein the nanoparticles comprise particles of a semiconductor material.

4. The power capacitor of claim 1, wherein the nanoparticles comprise particles of a metal oxide.

5. The power capacitor of claim 4, wherein at least some of the nanoparticles comprise titanium dioxide ($TiO_2$).

6. The power capacitor of claim 1, wherein at least some of the nanoparticles comprise aluminum oxide ($Al_2O_3$), silicon dioxide ($SiO_2$), silica, ceramic, or iron oxide ($Fe_2O_3$).

7. The power capacitor of claim 1, wherein the concentration of the nanoparticles in the base dielectric fluid is less than 0.025% by weight.

8. The power capacitor of claim 1, wherein the concentration of nanoparticles in the base dielectric fluid is between 0.01% by weight and 0.025% by weight.

9. The power capacitor of claim 1, wherein the first electrode and the second electrode comprise a metallic material, each of the first edge and the second edge comprises an irregular edge, and the nanoparticles are thickest on the irregular edge.

10. The power capacitor of claim 9, wherein the metallic material is a metal foil.

11. The power capacitor of claim 1, wherein the first electrode and the second electrode comprise metallic material, and at least a portion of each of the first edge and the second edge is smooth.

12. The power capacitor of claim 1, wherein the nanoparticles have a diameter of less than 30 nanometers (nm).

13. The power capacitor of claim 1, further comprising at least one bushing that extends from an exterior surface of the tank, the bushing comprising an electrical interface electrically connected to the at least one capacitive device in the interior space, wherein the electrical interface is configured to electrically connect at least one capacitive device to an external electrical device.

14. The power capacitor of claim 13, wherein the power capacitor is rated for use at voltages of 1000 Volts or greater, a plurality of capacitive devices are in the interior space, each capacitive device is a capacitor pack.

15. The power capacitor of claim 14, wherein the first and second surfaces of the film comprise deformities that accommodate the dielectric nanofluid.

16. The power capacitor of claim 15, wherein each capacitor pack is a wound capacitor pack.

17. The power capacitor of claim 1, wherein the base dielectric fluid comprises a green dielectric fluid.

18. The power capacitor of claim 1, wherein the base dielectric fluid comprises a seed-based dielectric fluid, a plant-based dielectric fluid, a dielectric fluid of one or more natural esters, and/or a dielectric fluid of one or more synthetic esters.

19. A method of assembling a capacitor system, the method comprising:

installing at least one capacitor pack into an interior space of a tank, the capacitor pack comprising: a first electrode and a second electrode spatially separated from the first electrode, the first electrode comprising a first active area having a first edge, the second electrode comprising a second active area that faces the first active area and has a second edge;

filling the interior space of the tank with a dielectric nanofluid that comprises a base dielectric fluid and nanoparticles distributed throughout the base dielectric fluid, wherein a concentration of the nanoparticles in the base dielectric fluid is less than 0.1% by weight and a breakdown voltage of the dielectric nanofluid is greater than a breakdown voltage of the base dielectric fluid; and removing air from the interior space, wherein the dielectric nanofluid is present throughout the interior space, between the first electrode and a first surface of a film of insulating material, between the second electrode and a second surface of the film, and nanoparticles coat the first edge and the second edge non-uniformly such that one or more portions of the first edge and the second edge have a greater thickness of nanoparticles than other portions.

20. The method of claim 19, further comprising: preparing the dielectric nanofluid.

21. A power capacitor comprising:

at least one capacitive device comprising:

a first electrode comprising a first active area having a first edge; and a second electrode separated from the first electrode, the second electrode comprising a second active area having a second edge; and a dielectric nanofluid, wherein nanoparticles coat at least a portion of one or more of the first edge of the first electrode of the power capacitor and a second edge of the second electrode of the power capacitor to thereby reduce partial discharge events at the first edge and the second edge, and the power capacitor has a rating of 1000 Volts or higher.

22. The power capacitor of claim 21, wherein the nanoparticles have a diameter of 30 nanometers (nm) or less, and the concentration of nanoparticles in the dielectric nanofluid is less than 0.025% by weight.

23. The power capacitor of claim 22, wherein the concentration of nanoparticles in the dielectric nanofluid is between 0.01% by weight and 0.025% by weight.

* * * * *